March 4, 1969 — H. E. CLARY — 3,430,969
PISTON WITH RING GROOVE REINFORCEMENT
Filed May 25, 1966
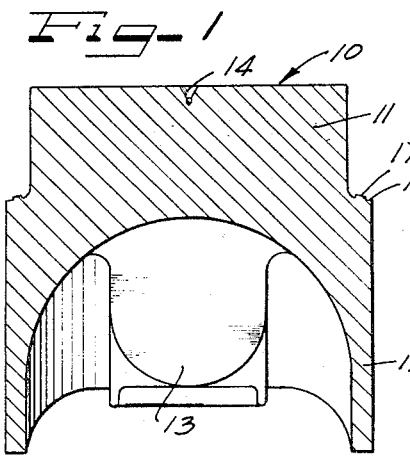
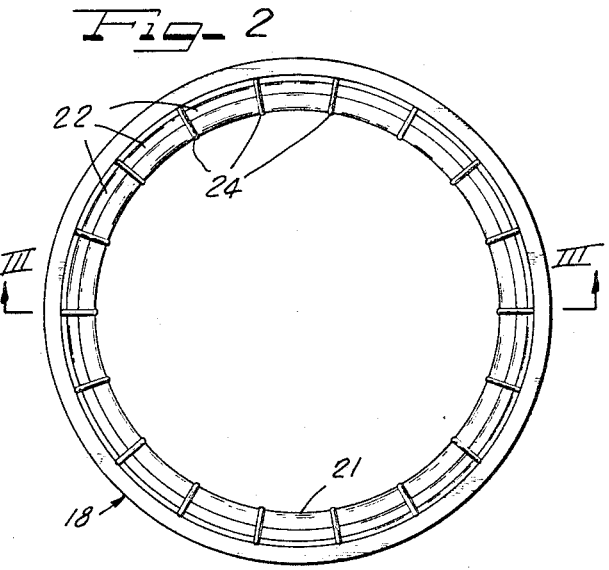
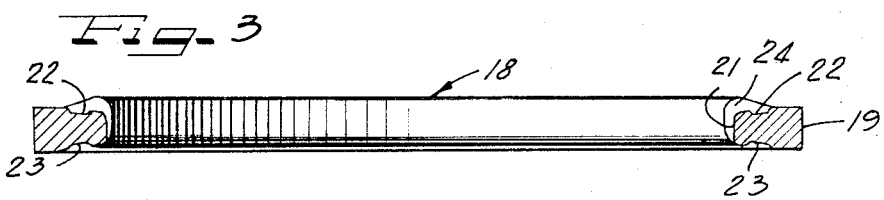
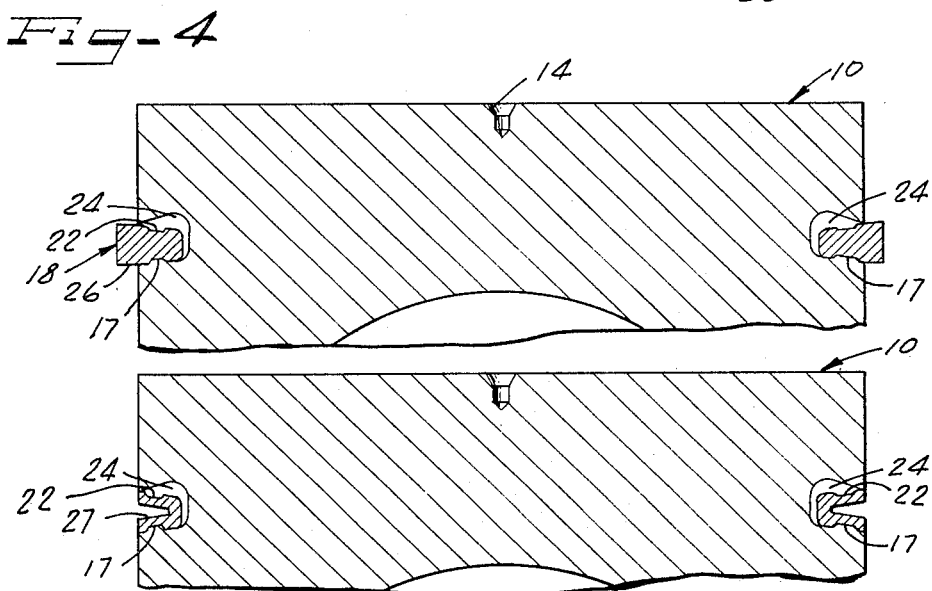
INVENTOR.
HARRY E. CLARY 3,430,969
PISTON WITH RING GROOVE REINFORCEMENT
Harry E. Clary, Chesterland, Ohio, assignor to TRW Inc.,
Cleveland, Ohio, a corporation of Ohio
Filed May 25, 1966, Ser. No. 552,898
U.S. Cl. 277—189.5                             5 Claims
Int. Cl. F16j 9/22, 9/00

ABSTRACT OF THE DISCLOSURE

Piston assemblies composed of aluminum alloy bodies and ferrous metal ring groove inserts wherein the insert is received within the groove in the piston body by virtue of a mechanical fit, without metallurgical bonding, and has an area to weight ratio of at least 60 square inches per pound to reduce the temperature differential which would normally exist between the metal of the piston and the ring groove insert under service conditions.

---

The present invention relates to improved pistons having ring groove reinforcement. It is specifically directed to the field of manufacturing light metal (aluminum or magnesium) alloy pistons having a substantially wear resistant ring groove insert.

Two methods of incorporating ferrous metal ring groove reinforcing rings have been used to a substantial extent in the past, both being employed in conjunction only with cast pistons. One widely used method involves bonding the reinforcing rings in place by means of metallurgical bonding during the casting process. While this method produces an acceptable reinforcing structure, it requires rather close control of the processing conditions to achieve the required metallurgical bonding.

The second method involves casting the piston around a stamped steel insert with numerous inwardly extending interlocking lugs. Such reinforcement, however, could be used only where an interrupted wear surface could be tolerated by the piston ring.

One of the objects of the present invention is to provide an improved light metal piston having a ring groove reinforcement having an adequate heat flow path between the piston and the insert.

Another object of the invention is to provide an improved ring groove reinforcement for pistons which can be used with both cast and forged pistons.

Still another object of the invention is to provide an improved light metal piston with a ring groove insert which does not require radial locking means and therefore does not provide a discontinuous wear surface for the piston ring.

Contrary to the usual practice, where discontinuities were provided in the insert ring to provide for mechanical locking of the ring to the head of the piston, I have now found that improved results are obtained through the use of a wear resistant metal ring which is continuous from its inner diameter to its outer diameter, provided that the configuration of the ring is such that the area to weight ratio of the insert ring is sufficiently high. The metal continuity referred to means that the insert rings of the present invention do not have metal lugs or holes which provide gaps in the metal integrity from the inner diameter to the outer diameter of the insert ring. This does not mean that the insert ring must have a uniform thickness throughout, as, indeed, it is preferable to provide one or more annular grooves in the faces of the ring but it is important that there be continuity of metal from the inner to the outer diameter.

The inertial loads on a reinforcing ring combined with the loads transmitted by the piston ring are insignificant. Consequently, a forged in place reinforcing ring could remain in firm contact with the aluminum if the stresses resulting from the difference in thermal expansion of the two members could be reduced to a level well below the yield strength of the aluminum at maximum operating temperature. The materials generally used for reinforcing rings have coefficients of thermal expansion very nearly equal to the coefficient for the light metal, but a significant difference in temperature between the two members can exist during transient conditions unless an adequate heat path exists.

The rate of heat transfer, Q, between the piston and the ring is:

$$Q = hA(Tae - Tr)$$

where $h$ is the overall coefficient of heat transfer across the interface, $A$ is the area of contact between the piston and the ring, $Tae$ is the temperature of the aluminum and $Tr$ is the temperature of the ring. The rate of change of temperature of the ring $\Delta T$ resulting from the flow of heat is:

$$\Delta T = Q/qw$$

where $q$ is the specific heat of the material of the ring, and $w$ is the weight of the ring.

Therefore:

$$\Delta T = \frac{hA(Tae - Tr)}{qw}$$

or $$\frac{\Delta T}{(Tae - Tr)} = \frac{h}{q} \cdot \frac{A}{W}$$

If the ratio $\Delta T$ divided by $Tae$ minus $Tr$ is large, the temperature difference between the aluminum and the ring will remain small, even during transient conditions. This ratio, of course, is dependent on the factors $h$, $q$, $A$ and $W$. The factor $q$, of course, is a property of the material of the ring. However, in accordance with the present invention, the ratio A over W is increased proportionally to the decrease in $h$ for an unbonded joint, so that the temperature of the ring follows the temperature of the piston closely. With the temperature differential between the two members being held to a low value, there are no loads great enough to cause the aluminum to yield and allow the ring to become loose.

In accordance with the present invention, I provide a light metal piston comprising a body of light metal having a circumferential groove therein, and a wear resistant insert ring received within the groove, the insert ring being imperforate between its inner diameter and its outer diameter, and having an area to weight ratio of at least 60 square inches per pound. The area, of course, is the total area of the insert in contact with the piston alloy. Both the parameters, the area and the weight, should be computed from the final dimensions of the components.

I have also found that the radial width of the insert should be no larger than is required by the ring groove dimensions and the area to weight ratio limitation expressed above. Experience has shown that an insert with a relatively small inner diameter to outer diameter ratio seriously reduces the flow of heat from the head and crown of the piston, and thermal stress failures may occur. An insert having an inner diameter above about 95% of the outer diameter has about the right proportions for a piston having an outer diameter of 4 to 5 inches. This ratio is based upon a continuous inner diameter of the insert, rather than a dimension between fins or ribs.

A further description of the present invention will be made in conjunction with the attached sheet of drawings which illustrates a preferred embodiment of the invention.

In the drawings

FIGURE 1 is a cross-sectional view of a piston which can be used in accordance with the present invention, in an early stage of fabrication;

FIGURE 2 is a plan view of a reinforcing ring insert used according to the present invention;

FIGURE 3 is a cross-sectional view taken substantially along the line III—III of FIGURE 2;

FIGURE 4 is an enlarged fragmentary cross-sectional view of the piston and ring insert assembly after the head of the piston has been upset forged about the ring insert; and FIGURE 5 is a view similar to FIGURE 4 but illustrating the configuration of the ring insert after it has been machined.

As shown in the drawings

In FIGURE 1, reference numeral 10 indicates generally a preformed piston blank composed of a light metal such as aluminum alloy. The piston 10 has a head portion generally indicated at reference numeral 11, a skirt portion generally indicated at reference numeral 12 and thickened pin bosses 13 depending from the head inside of the skirt on diametrically opposite sides thereof. The head of the piston may be provided with a recess 14 for centering the piston blank on metal working machinery.

The head portion 11 of the piston blank is provided with an annular shoulder 16, and a continuous annular rib 17 is formed thereon for the purpose of seating the reinforcing ring insert generally indicated at reference numeral 18.

As best seen in FIGURES 2 and 3, the ring insert 18 which is preferably composed of a wear resistant metal such as a high nickel cast iron of the "Ni-Resist" type has an outer diameter generally indicated at numeral 19 and an inner diameter indicated at reference numeral 21. Between the two diameters, the ring insert is continuous and imperforate in that there are no holes or lugs struck out from the metal. The ring insert may, however, have an upper groove 22 formed as a continuous annulus medially of the inner and outer diameters, and a lower groove 23 is similarly positioned on the underside of the ring insert 18. The dimensions of the lower groove 23 are such that the insert ring 18 can be seated over the rib 17 on the piston, as best illustrated in FIGURE 4 of the drawings. The grooves 22 and 23 serve to increase the area of contact between the insert ring 18 and the piston head and thereby increase the area available for heat transfer. The groove 22 also serves to receive the metal from the piston head 11 when the piston is forged about the ring 18 to thereby help lock the insert ring 18 relative to the piston.

The insert ring 18 also has a plurality of radially oriented ribs 24 spaced equally about the periphery between the inner and outer diameters thereof, the ribs functioning to provide still additional surface area and providing a locking with the metal of the piston head to prevent relative rotative movement.

The insert ring 18 is positioned over the piston head 10 with the groove 23 over the rib 17. As best seen in FIGURE 4, the insert ring 18 is somewhat oversized initially with respect to the diameter of the piston so that a peripheral portion 26 extends beyond the outer diameter of the piston. Generally, the outer diameter of the insert may be initially about 1/16 to 1/8 inch larger than the finished diameter of the piston to provide additional strength when the insert ring is forged in place. Also, this portion of the insert ring may be used to secure the insert in a mold, where the piston is to be cast around the insert ring.

The structure shown in FIGURE 4 illustrates the condition of the assembly after the head 11 of the piston is upset forged about the insert ring 18. The metal of the piston is forced into the groove 22 and about the ribs 24. This provides a secure locking of the insert ring within the body of the piston head without resorting to metallurgical bonding.

In the final step of the process as illustrated in FIGURE 5, the excess 26 is machined off, and the groove 27 is machined inwardly of the insert ring.

When using thin insert rings, the area to weight ratio of the rings can be made quite large. Area to weight ratios of 130 square inches per pound are obtainable with the type of structure described herein, as compared with a typical metallurgically bonded insert which has an area to weight ratio of about 56 square inches per pound. It has been found that the insert ring of the present invention provides an adequate heat flow path between the piston and the insert which does not require radial locking means which would otherwise result in a discontinuous wear surface being present for the piston ring.

From the foregoing, it will be understood that the piston assembly of the present invention provides an improved ring groove reinforcement which reduces the temperature difference between the light metal piston body and the insert ring, even during transient conditions. Consequently, the loads present on the piston are not great enough to cause the light metal to yield and allow the ring to become loose.

It should be evident that various modifications can be made to the described embodiments without departing from the scope of the present invention.

I claim as my invention:

1. A piston comprising an aluminum alloy body having a circumferential groove therein and a ferrous metal insert ring received in tight mechanical engagement with said groove, the junction between said ring and said groove being substantially devoid of metallurgical bonding, said ring having non-planar opposed faces including raised portions thereon and having an area to weight ratio of at least 60 square inches of ring in contact with the piston per pound of ring, thereby reducing the temperature differential between said ring and said piston in service.

2. The piston of claim 1 in which said insert ring is imperforate between its inner and outer diameters.

3. The piston of claim 1 in which said insert ring includes spaced ribs extending radially between the inner and outer diameters thereof.

4. The piston of claim 1 in which said insert ring has an annular groove medially of said ring on the opposite surfaces thereof.

5. The piston of claim 1 in which the inner diameter of the insert ring is at least about 95% of its outer diameter.

References Cited

UNITED STATES PATENTS

| 2,024,058 | 12/1935 | Oubridge | 227—189.5 |
| 2,550,879 | 5/1951 | Stevens | 277—189.5 X |
| 3,118,712 | 1/1964 | Daub | 277—189.5 |
| 3,183,796 | 5/1965 | Christen et al. | 277—189.5 X |

FOREIGN PATENTS

| 258,408 | 5/1949 | Switzerland. |
| 51,979 | 2/1942 | Netherlands. |

SAMUEL ROTHBERG, *Primary Examiner.*

U.S. Cl. X.R.

92—222